United States Patent [19]

Skrzypek

[11] Patent Number: 4,613,015

[45] Date of Patent: Sep. 23, 1986

[54] SELF ENERGIZING EMERGENCY BRAKE AND ANTI-SIDE-SKID APPARATUS

[76] Inventor: James R. Skrzypek, #1 Tricia La., Barrington Hills, Ill. 60010

[21] Appl. No.: 623,505

[22] Filed: Jun. 22, 1984

[51] Int. Cl.$^4$ .............................................. B60T 1/14
[52] U.S. Cl. ........................................ 188/6; 280/188
[58] Field of Search .................. 188/5, 6, 7, 8, 16, 188/19; 280/188

[56] References Cited

U.S. PATENT DOCUMENTS

| 1,495,916 | 5/1924 | McNames | 188/5 |
| 2,049,357 | 7/1936 | Daignault | 188/5 |
| 2,608,274 | 8/1952 | Kromer | 188/5 |
| 3,042,150 | 7/1962 | Lukawsky | 188/5 X |
| 3,113,641 | 12/1963 | Metailler | 188/7 |
| 3,799,293 | 3/1974 | Howells et al. | 188/5 |
| 3,994,369 | 11/1976 | Powaska | 188/5 |

FOREIGN PATENT DOCUMENTS 759213 1/1934 France .................... 188/6

Primary Examiner—Bruce H. Stoner, Jr.
Assistant Examiner—Richard R. Diefendorf
Attorney, Agent, or Firm—McCaleb, Lucas & Brugman

[57] ABSTRACT

One pair of emergency drag brake units are at each end of a vehicle. Each unit comprises a leg member with a serrate-toothed, ground-engageable foot telescopically movable in a support member carried by the frame. An elastic member is shown in one embodiment urging the leg downwardly to maintain pressure on the ground. Hydraulic jacks move the feet to braking positions engaging the ground while the axes of the leg members at each end of the vehicle are inclined toward the other end of the vehicle at an acute angle of 15° or more relative to the vertical, thereby automatically enabling the so-inclined legs at the trailing end of a skidding vehicle to exert a greater frictional drag than the oppositely inclined legs at the leading end regardless of the vehicle's forwardly or rearwardly skidding orientation, and stopping it in a straight line. In one embodiment, the jacks swing the support members about pivots. In the other embodiment, the jacks extend the legs downwardly from fixed support members along inclined axes.

5 Claims, 6 Drawing Figures

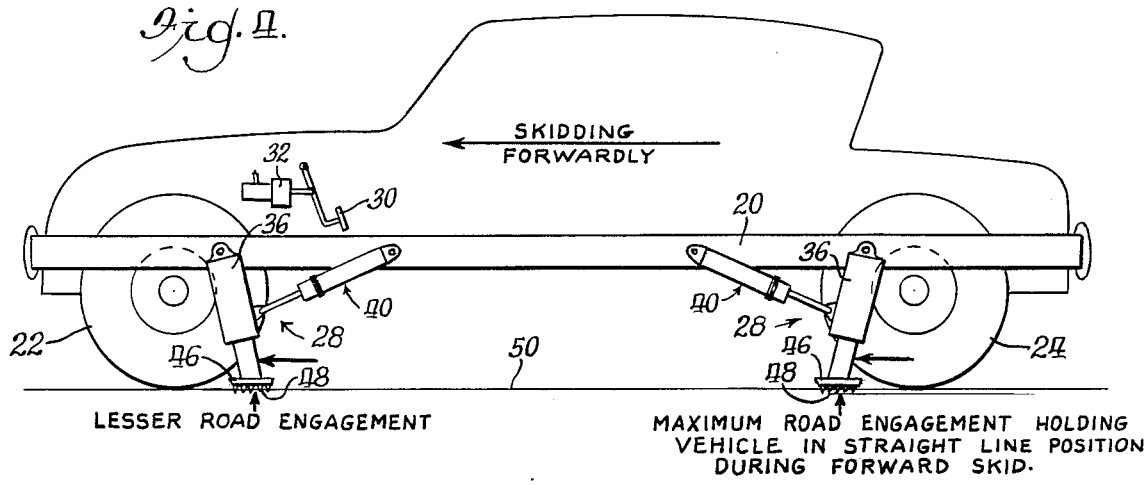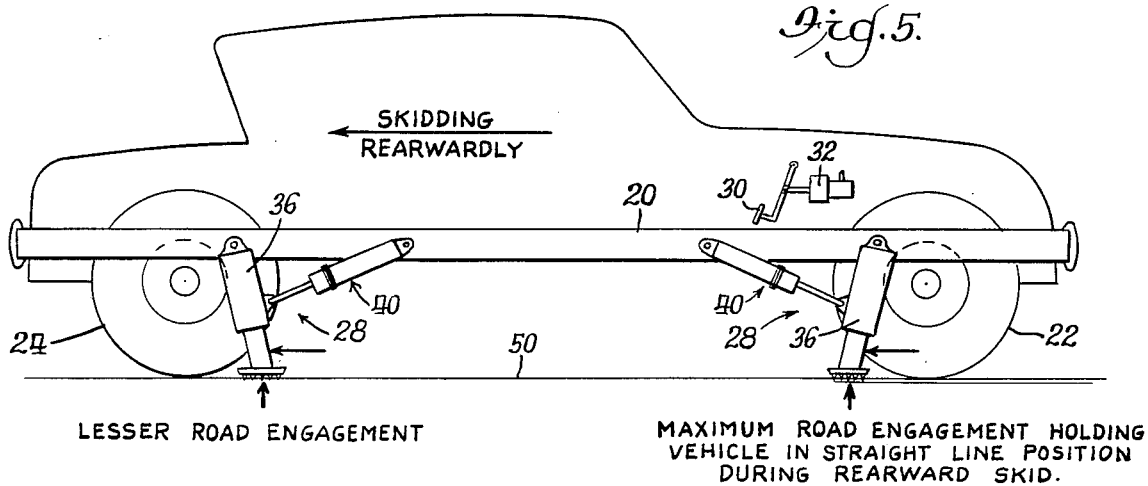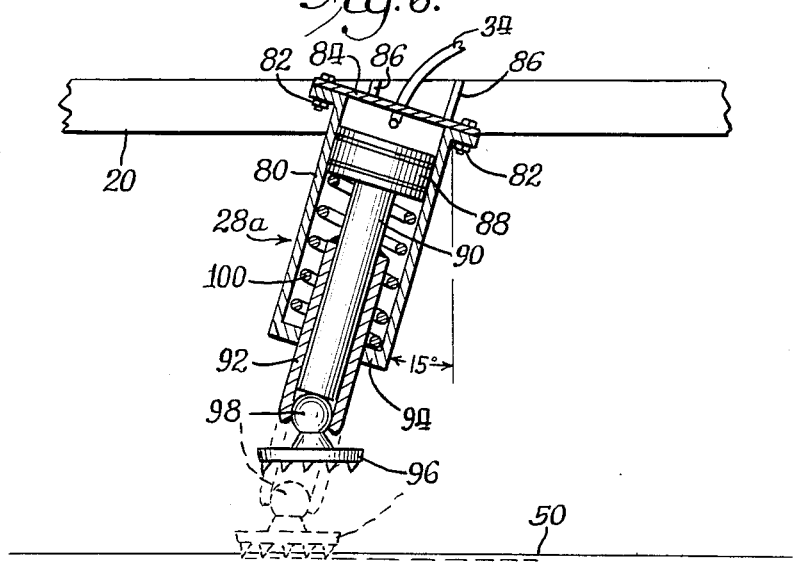

SELF ENERGIZING EMERGENCY BRAKE AND ANTI-SIDE-SKID APPARATUS

BACKGROUND OF THE INVENTION

This invention relates to brakes for automotive vehicles and particularly to supplemental, emergency brakes which can be applied in a panic situation to avoid collision and injury by bringing a vehicle quickly to a straight line stop on icy, wet or slippery ground or pavement.

When a vehicle travels on wet or icy pavement, frictional engagement between the tires and roadway needed for safe steering and braking control is reduced. Normal steering and braking maneuvers which would be safe and effective on dry pavement become extremely hazardous on slippery pavement and may throw a vehicle into a sidewise skid, causing death, severe injury and substantial property damage. Such hazardous driving conditions can exist on wet pavement at moderate and high speeds from a condition called "planing" where the tires are supported on a slippery water film and have little or no frictional engagement with the pavement.

Restraint devices such as seat and shoulder belts, head rests, and air bags, are effective safety accessories and have saved many lives and reduced the number and severity of injuries in head-on and rear end collisions, major hazards for which they were developed. However, they cannot prevent collision damage to the vehicle and are relatively ineffective to prevent injuries when a vehicle spins or skids sidewise out of control. A spinning or skidding car striking a curb sidewise can jar a door open and throw passengers onto the ground an instant before the car rolls over on them.

Supplemental emergency brakes have been proposed for actuation in a panic situation to avert an imminent collision. These take the form of skids, feet, toothed wheels, or the like, with driver control means for suddenly engaging them with the ground. Examples are shown in U.S. Pat. Nos. 2,049,357 and 3,042,150 (spiked feet); U.S. Pat. Nos. 3,799,293 and 3,994,369 (friction skids); and U.S. Pat. No. 2,608,274 (spiked shoes or backwardly-rotating wheels). Except for U.S. Pat. No. 3,799,293 where a single such device has been fitted only at the rear of the vehicle, none of them have been effective to avoid a spin or side skid or to straighten the vehicle once the spin or skid begins. Further, in a device such as shown in U.S. Pat. No. 3,799,293, if it is actuated when the vehicle has spun completely around, the resulting sudden stopping of the rear end can dangerously accelerate the spin instead of correcting it.

SUMMARY OF THE INVENTION

A general object of the present invention is to provide an emergency drag brake system, supplementing the conventional wheel brakes of a vehicle, and being actuatable by the driver in a panic situation to stop the vehicle quickly and safely in a straight line.

Another object is to provide at opposite ends of a vehicle emergency drag brakes which automatically apply greater frictional drag at the trailing end of a side skidding or spinning vehicle than at the leading end irrespective of whether the trailing or leading ends of the vehicle are its front or rear ends.

Another object is to provide such an emergency drag brake system in which both the rear- and front-located drag brakes are actuatable under a driver's control to apply a substantial frictional drag against the ground or pavement, and the drag brakes on the trailing end of a vehicle, whether skidding forwardly or backwardly, are automatically self-energizable to apply a substantially greater frictional drag to correct the skid and stop the vehicle in a straight line.

Another object is to provide such an emergency drag brake system having brake units at both ends of the vehicle, each having a ground-engageable foot member at the bottom of the leg which in breaking position is inclined downwardly toward the opposite end of the vehicle.

BRIEF DESCRIPTION OF THE DRAWINGS

FIG. 4 is a side view of FIG. 1 with the outline of a motor vehicle body shown with the emergency brake system activated in a forwardly skidding mode;

FIG. 5 is a side view similar to FIG. 4 shown with the emergency brake system activated in a rearwardly skidding mode; and FIG. 6 is a vertical cross-sectional view of a modified form of the invention.

Like parts are referred to by like reference characters.

DESCRIPTION OF THE PREFERRED EMBODIMENTS

Figure 1:
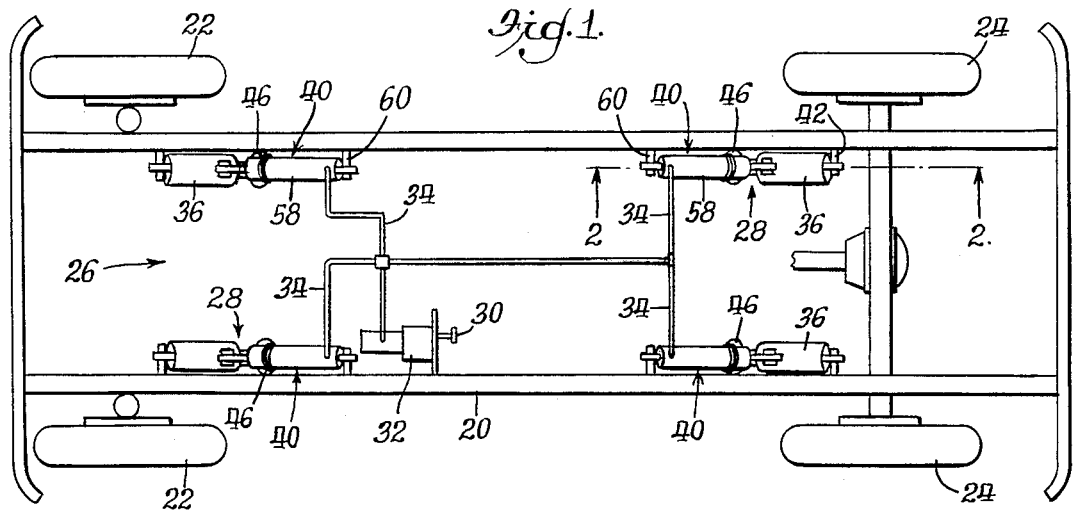
FIG. 1 is a diagrammatic top plan view of the chassis of a motor vehicle embodying the invention.

Referring now to the embodiment of the invention in FIGS. 1–5, an automotive vehicle frame of chassis 20 has pairs of front and rear wheels 22 and 24 respectively. These may be provided with conventional brakes (not shown).

Automatically selective self-energizing emergency drag brake and anti-skid apparatus of the present invention is generally indicated 26 and comprises four drag brake units 28 actuatable by a special, separate, emergency pedal 30 through a master cylinder 32 and pressure tubes 34.

Each drag brake unit 28 comprises a tubular support member 36, a leg member 38, and a hydraulic jack 40.

Figure 3:
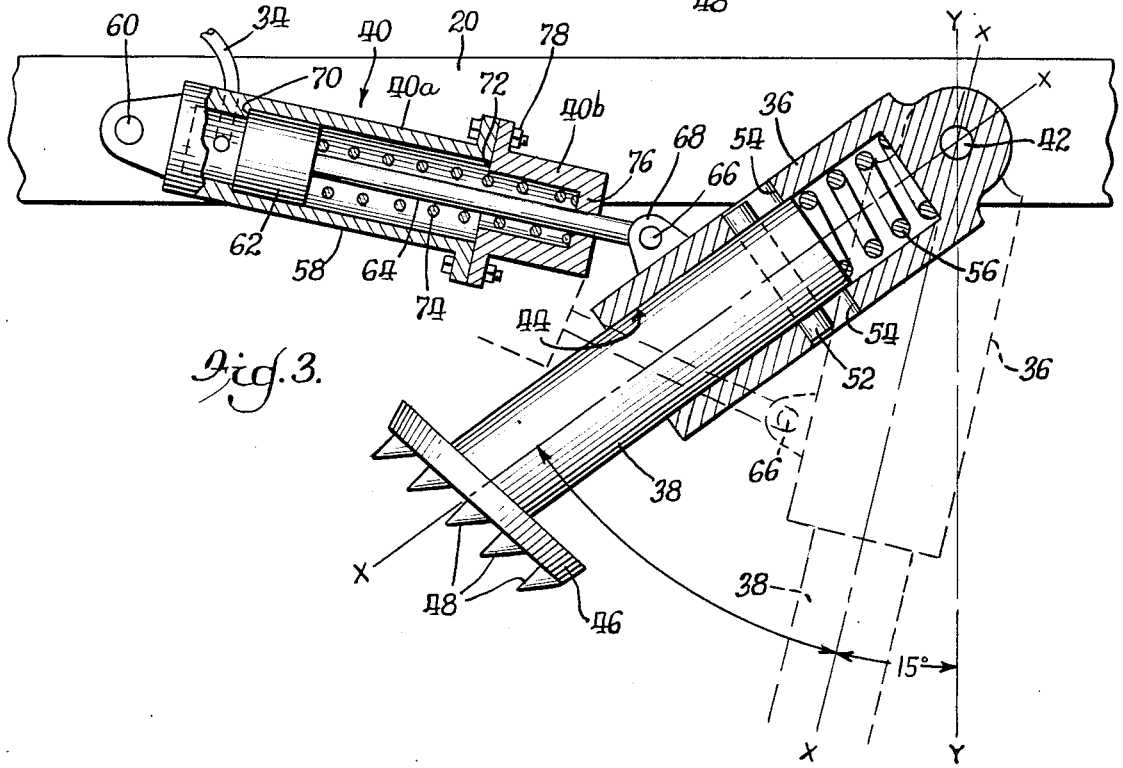
FIG. 3 is a fragmentary enlarged view of FIG. 2.

Each support member 36 is pivoted about a pin 42 on the frame 20 and has a downwardly open axial bore 44 in which the leg member 38 is telescopically slidable for up and down movement along a working axis X—X. The position of axis X—X during braking is important to the automatic, selectively self-energizing feature of this invention; as will be described, it should be inclined inwardly, toward the opposite end of the vehicle, at an acute angle of 15° or more relative to the vertical represented by vertical axis Y—Y (FIG. 3). A foot 46 is carried at the bottom of each leg, each foot having teeth 48 shaped to apply an effective frictional drag to a pavement surface 50 in both forward and rearward directions, but applying a greater drag in one direction than the other.

Each leg has a cross pin 52 with opposite ends positioned in axially elongated slots 54. Axial movement of each leg relative to the respective support member is limited by the axial lengths of the slots 54.

A resilient member, namely a compression coil spring 56, is in the head end of the support tube member, compressibly interposed between the support and leg members to urge the leg downwardly to its fully extended limit determined by the positions of the lower ends of the slots 54.

Each hydraulic jack 40 comprises a cylinder 58 pivoted about a pin 60 mounted on the frame 20. It has a piston 62 with a piston rod 64 pivotally connected by a cross pin 66 and a pair of gudgeon brackets 68 on the outside of the support tube 36. The piston 62 is movable between solid and broken line positions (FIGS. 2 and 3) through a range determined by stop shoulders 70 and 72 in the cylinder. A heavy compression spring 74 is compressibly interposed between the underside of the piston and the end wall 76. To facilitate assembly, the cylinder casing is made in two parts 40a and 40b with flanges held together by bolts 78. As a design convenience, the limit shoulder 72 may be the inner end of part 40b as shown.

Figure 2:
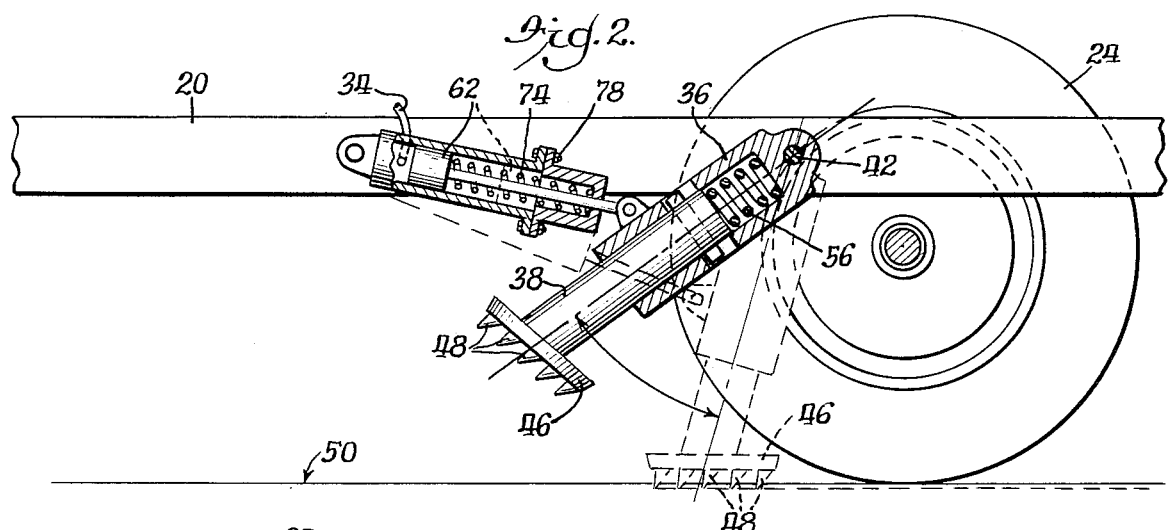
FIG. 2 is an enlarged, fragmentary, vertical cross-sectional view of FIG. 1, taken on line 2—2.

The combined length of each pivoted support member 36 and corresponding leg 38 is sufficient to engage the foot 46 with the ground or roadway as shown in broken lines in FIG. 2 when pressure is applied to the head end of the cylinder through the respective pressure tube 34. The stop shoulder 72 limits outward movement of the piston rod 64 to the position shown in broken lines in FIGS. 2 and 3 where the axes of the legs 38 at the rear of the vehicle are inclined forwardly 15° or more from the vertical axis Y—Y when the feet engage the ground; likewise, the axes of the legs 38 at the front of the vehicle are inclined rearwardly 15° or more when the feet engage the ground. Further, the serrate configuration of the saw teeth 48 is such that they tend to dig into the pavement any time they are moving in a forward direction (for example, toward the left in FIG. 2).

Thus, the combination of the inclined legs 38, the serrate configurations of the teeth 48, and the heavy compression springs 56, presses the teeth at the lagging end of a vehicle into the pavement to provide a relatively high hold back drag, and presses the teeth at the leading end against the pavement to provide a substantial but somewhat lower drag. For best wear resistance on a wide variety of pavement and roadway surfaces including concrete and stone, the teeth 48 preferably will be made of some extremely hard, wear-resistant material such as tungsten carbide. Further, the individual teeth or feet 46 may be made easily replaceable (by means not shown).

To activate the emergency drag brake system in a panic situation where it is obvious the conventional wheel brakes will not avert a collision, and the vehicle may be spinning or skidding out of control, a suitable activating element such as the special emergency pedal 30 is pressed to direct fluid under pressure from the master cylinder 32 to the four individual pressure tubes 34 leading to the respective hydraulic jacks 40. This simultaneously pressurizes cylinders 58 and swings legs 38 to the positions shown in FIGS. 4 and 5 (and in broken lines in FIGS. 2 and 3).

As a specific example, if the vehicle is skidding forwardly as shown in FIG. 4 at the instant the emergency pedal 30 activates the emergency drag brake system, the teeth in the rear feet 46 will apply a substantially greater hold back drag than the teeth on the front, thereby automatically holding the vehicle in a straight line while it stops. If the vehicle is skidding or spinning toward a sidewise orientation at the moment the emergency drag brakes are applied, the frictional drag on the rear feet will straighten out the vehicle and bring it to a straight line stop. Conversely, if it is skidding or spinning with the front end lagging at the instant the emergency drag brakes are applied, the frictional drag on the front will straighten the vehicle out in a rearward direction as shown in FIG. 5 and bring it to a straight line stop.

The heavy compression springs 56 urge the feet 46 downwardly holding them solidly against the pavement to compensate for undulations in the pavement surface and up and down movement of the vehicle.

When the emergency has abated, the vehicle safely stopped, and pedal 30 released, the drag brake units 28 will automatically be returned to the stowed positions illustrated in solid lines in FIGS. 2 and 3, by return springs 74. If the teeth have dug into the pavement or ground, they will readily be released by rocking the vehicle forward and backward.

An alternate drag brake unit embodiment 28a is shown in FIG. 6. This may be substituted for each of the units 28 described above. It comprises a cylinder 80 fixed at a 15° angle or more relative to the vertical and is mounted by bolt studs 82 on the underside of an angled bracket 84 welded or otherwise fastened to the frame 20. The bracket includes stiffening gussets 86. A piston 88 is slideably mounted within the cylinder and has a piston rod 90 with an external cylindrical sleeve 92 journaled for telescopic movement through end wall 94. At the lower end of the sleeve, a serrate-toothed, ground engageable foot 96, similar to foot 46, is angularly adjustably connected by means of a ball joint 98. The piston 88, foot 96, and associated parts are moveable between an upper, stowed position shown in solid lines to a lower, pavement-engaging position shown in broken lines. Downward movement to the pavement engaging position is achieved by pressing the pedal 30 and pressurizing line 34. After a safe emergency stop has been achieved, and the pedal 30 released, a spring 100 will return the piston and foot to the stowed, solid line position.

While particular examples of the present invention have been shown and described, it will be apparent that changes and modifications may be made without departing from the invention in its broadest aspects. The aim of the appended claims, therefore, is to cover all such changes and modifications included within the spirit and scope of the invention.

The embodiments of the present invention in which an exclusive property or privilege is claimed are defined as follows:

1. Self-energizing emergency drag brake and anti-side-skid apparatus for an automotive vehicle having a frame with front and rear wheels at opposite ends thereof comprising:
   a support member pivotally mounted on the frame adjacent each wheel for forward and backward swinging movement between an emergency braking position and a stowed, non-braking position;
   a leg member extending downwardly from each support member and telescopically connected thereto for slidable movement along a working axis;
   each leg member having its said working axis simultaneously sloping downwardly at a predetermined acute angle relative to the vertical toward the opposite end of the frame when its corresponding support member is disposed in its said emergency braking position;
   each said leg member, further, having its said working axis sloping at an angle greater than said predetermined acute angle toward the opposite end of the frame when its corresponding support member is disposed in its said stowed non-braking position;

a foot member with ground-engaging teeth at the bottom of each leg member, and each leg and foot member being of sufficient length to engage the ground when the support members are in their emergency braking positions;

hydraulic cylinder and piston means connected between each of the support members and the frame and actuatable to move the support members concurrently between their stowed, non-braking positions and their emergency braking positions;

stop means positively limiting the swinging movement of the support members at opposite ends of a range between said braking and non-braking positions; and elastic member interposed between the support members and corresponding leg members effective to press said teeth downwardly against the ground when the support members are in said emergency braking positions.

2. Self-energizing emergency drag brake and anti-side-skid apparatus according to claim 1 in which each corresponding leg and support member has mutually engaging telescopically slidable surfaces with means acting between said surfaces to limit relative movement thereof.

3. Self-energizing emergency drag brake and anti-side-skid apparatus according to claim 1 in which said stop means comprises shoulder means carried by said hydraulic cylinder and piston means.

4. Self-energizing emergency drag brake and anti-side-skid apparatus according to claim 1 in which said predetermined angle for the working axis of each leg member being at least 15° relative to the vertical in said emergency braking position.

5. Self-energizing emergency drag brake and anti-side-skid apparatus according to claim 1 in which said teeth are serrate shaped and oriented to exert a greater frictional drag at the trailing end of a skidding vehicle irrespective of whether said trailing end is the front or rear end of the vehicle.

* * * * *